United States Patent
Nakamura (10) Patent No.: US 6,185,338 B1
(45) Date of Patent: *Feb. 6, 2001

(54) CHARACTER RECOGNITION USING CANDIDATE FRAMES TO DETERMINE CHARACTER LOCATION

(75) Inventor: Mitsuaki Nakamura, Yamatokooriyama (JP)

(73) Assignee: Sharp Kabushiki Kaisha, Osaka (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/828,291

(22) Filed: Mar. 21, 1997

(30) Foreign Application Priority Data

Mar. 26, 1996 (JP) .................................. 8-069756

(51) Int. Cl.⁷ ...................................... G06K 9/72
(52) U.S. Cl. ...................... 382/229; 382/105; 382/177
(58) Field of Search ................... 382/229, 105, 382/181, 182, 184, 187, 190, 209, 217, 218, 219, 220, 221, 305, 173, 177

(56) References Cited

U.S. PATENT DOCUMENTS

| | | | |
|---|---|---|---|
| 4,567,609 | * | 1/1986 | Metcalf ................................. 382/105 |
| 4,802,231 | * | 1/1989 | Davis ................................... 382/219 |
| 5,065,440 | * | 11/1991 | Yoshida et al. ....................... 382/219 |
| 5,081,685 | * | 1/1992 | Jones, III et al. .................... 382/105 |
| 5,285,505 | * | 2/1994 | Kim et al. ............................ 382/219 |
| 5,315,664 | * | 5/1994 | Kumagai ............................... 382/105 |
| 5,425,108 | * | 6/1995 | Hwang et al. ......................... 382/105 |
| 5,502,777 | * | 3/1996 | Ikemure ................................ 382/173 |
| 5,600,736 | * | 2/1997 | Hagita .................................. 382/219 |
| 5,651,075 | * | 7/1997 | Frazier et al. ........................ 382/105 |
| 5,734,750 | * | 3/1998 | Arai et al. ............................ 382/187 |
| 5,754,685 | * | 5/1998 | Takahashi et al. .................... 382/181 |
| 5,784,501 | * | 7/1998 | Tanaka ................................. 382/305 |

FOREIGN PATENT DOCUMENTS

| | | | |
|---|---|---|---|
| 41 35 881 A1 | 5/1993 | (DE) | ................. G06K/9/48 |
| 0 045 549 A1 | 2/1982 | (EP) | ................. G06K/9/46 |
| 2-206894 | 8/1990 | (JP) | ................. G08K/9/20 |
| 6-131492 | 5/1994 | (JP) | ................. G06K/9/20 |
| 92/06449 | 4/1992 | (WO) | ................. G06K/9/36 |

\* cited by examiner

Primary Examiner—Matthew C. Bella
(74) Attorney, Agent, or Firm—Nixon & Vanderhye, P.C.

(57) ABSTRACT

A character recognition method for recognizing characters on an article having multiple character-bearing areas, such as a license plate, first involves obtaining image data from an image of the article. The method then assigns at least one parameter to a selected character-bearing area on the article. The method then attempts to obtain a correct frame which expresses the correct positional relationship between the selected character-bearing area on the article with other character-bearing areas of the article, and then uses that correct frame to perform character recognition with respect to each of the character-bearing areas of the article. To obtain the correct frame, the invention compares the image data of the article with plural candidate frames. The plural candidate frames are calculated using the predetermined positional correlation between (1) the selected character-bearing area [as represented by the at least one parameter] and (2) other character-bearing areas of the article.

12 Claims, 8 Drawing Sheets

| RECTANGLE NO. / INFORMATION | 1 | 2 | ... | n |
|---|---|---|---|---|
| 1st OR 2nd LINE | 1 | 1 | ... | 2 |
| LEFT TOP POINT COORDINATES | (101,150) | (125,148) | ... | (200,183) |
| RIGHT BOTTOM COORDINATES | (124,176) | (147,175) | ... | (229,238) |
| CENTER COORDINATES | (112,163) | (136,161) | ... | (214,205) |
| ... | ... | ... | ... | ... |

| | | |
|---|---|---|
| 1st ORDER (SIMILARITY) | 奈 (50) | 泉 (40) |
| 2nd ORDER | 京 (30) | 良 (35) |
| 3rd ORDER | 志 (25) | 良 (32) |
| 4th ORDER | 宮 (20) | 青 (25) |
| ... | ... | ... |

(b)

| ORDER | CANDIDATE OF BRANCH OFFICE-NAME | AVERAGE OF SIMILARITY |
|---|---|---|
| 1 | 奈良 | 42 |
| 2 | 和泉 | 27 |
| 3 | 京都 | 21 |
| 4 | 宮崎 | 15 |
| ... | ... | ... |

→ "奈良"

CHARACTER RECOGNITION USING CANDIDATE FRAMES TO DETERMINE CHARACTER LOCATION

BACKGROUND OF THE INVENTION

I. Field of the Invention

The present invention concerns character recognition.

II. Related Art and Other Considerations

Japanese Laid-Open Patent Publication No. 2-206894 proposes a character recognition method that recognizes characters of, e.g., a license plate of an automobile by binarizing an image of character areas on the license plate and seeking a 4-digit serial number composed of relatively large characters included in the binary image by key features (e.g., width of characters and gap between characters) of the license plate.

Japanese Laid-Open Patent Publication No. 6-131492 proposes a character recognition method that searches an area by relative positions determined from information on position of a 4-digit serial number and then recognizes characters in each of the determined character areas.

In the former method it is difficult to accurately determine the position of a serial number if any positional information on any digit of the 4-digit serial number could not correctly be obtained due to (1) noise caused by an incorrect positioning or conditioning of an image-taking camera or (2) the obtained serial number containing only 1 digit or 2 digits, i.e., a reduced number of large-size characters.

The latter method also requires the accurate determination of the serial number because its location is a key to determine areas of the other character areas. For example, in this latter method it is difficult to correctly presume character areas in an image of a license plate if the input image lacks a part of a license plate or does not indicate a part of a serial number due to an obstruction or it includes noise signals caused by both side frames, an indicator lamp and so on.

SUMMARY OF THE INVENTION

The present invention relates to a character recognizing method which is used for extracting characters (including numerals) indicated for example on a license plate of an automobile and recognizing the extracted characters.

In view of the foregoing drawbacks of the conventional character recognizing method which extracts serial number and presumes other character areas on the basis of relative positions of the extracted serial number area, the present invention is made to provide a character recognition method which is capable of accurately recognizing all characters contained in an object image of, e.g., a license plate by means of previously setting a certain number of area-frame candidates according to known arrangement of serial-number digit areas, a use-code area, a land-transport administration branch office-name/classification number area, selecting one of the area-frame candidates, which has the minimum inconformity in relative positions of characters in respective character areas, determining respective character areas on the selected area-frame and then recognizing each character in each character area.

An object of the present invention is to provide a character recognizing method which comprises the steps of: extracting information on each of rectangles circumscribing respective characters contained in an inputted binary quantized image; selecting least disagreed one of candidates of area frames preset according to a known format of character areas on a recognition object by comparing each of the candidates with the extracted character-circumscribed rectangles as to inconformity (contradiction) in relative arrangement of the rectangles to character areas on an area frame; and recognizing characters indicated in the s elected character areas respectively. A character recognition object (e.g., a license plate of an automobile) has a certain known format of character areas. However, the same character-recognition objects may have a variety of sizes and relative positions of character areas as well as a plurality of area-frame candidates. As this method compares each of area-frame candidates with extracted information on character-circumscribing rectangles and selects such an area-frame candidate that has the least inconformity of positions of their character areas relative to the rectangles, the selected character areas may have a correct relation with the extracted rectangles even if an input image does not include a part of the character recognition object or lacks a part of information due to an obstruction or it contains noise signals from peripheral portion of the object. Thus, the method can attain a high accuracy of character recognition since it recognizes each of characters on the character area candidate selected according to the least inconformity criterion.

Another object of the present invention is to provide a character recognition method which includes the content of the invention above mentioned and is further featured in that the step of selecting least disagreed one of area-frame candidates consists of calculating a degree of inconformity in properties and conditions of character areas of candidate to the extracted information on character-circumscribed rectangles, determining a total of the calculated inconformity values of the character areas and selecting an area frame having the least inconformity. This method can attain a considerably improved accuracy of selecting a correct area frame.

A further object of the present invention is to provide a character recognition method which includes the content of the invention first-mentioned and is further featured in that the step of recognizing a string of characters selects a character string having the largest average value of similarities of compare d characters. A character string consists of a known and considerable limited combination of characters. Therefore, this method can attain an increased accuracy of recognizing a character string owing to selecting a character string whose characters have the largest value of similarity with those of the previously determined character string.

PREFERRED EMBODIMENT OF THE INVENTION

Preferred embodiments of the present invention will be described below in detail with reference to the accompanying drawings. In the following description, character recognizing methods are applied, by way of example, to recognizing characters indicated on a license plate of an automobile.

[Embodiment 1]

Figure 1:
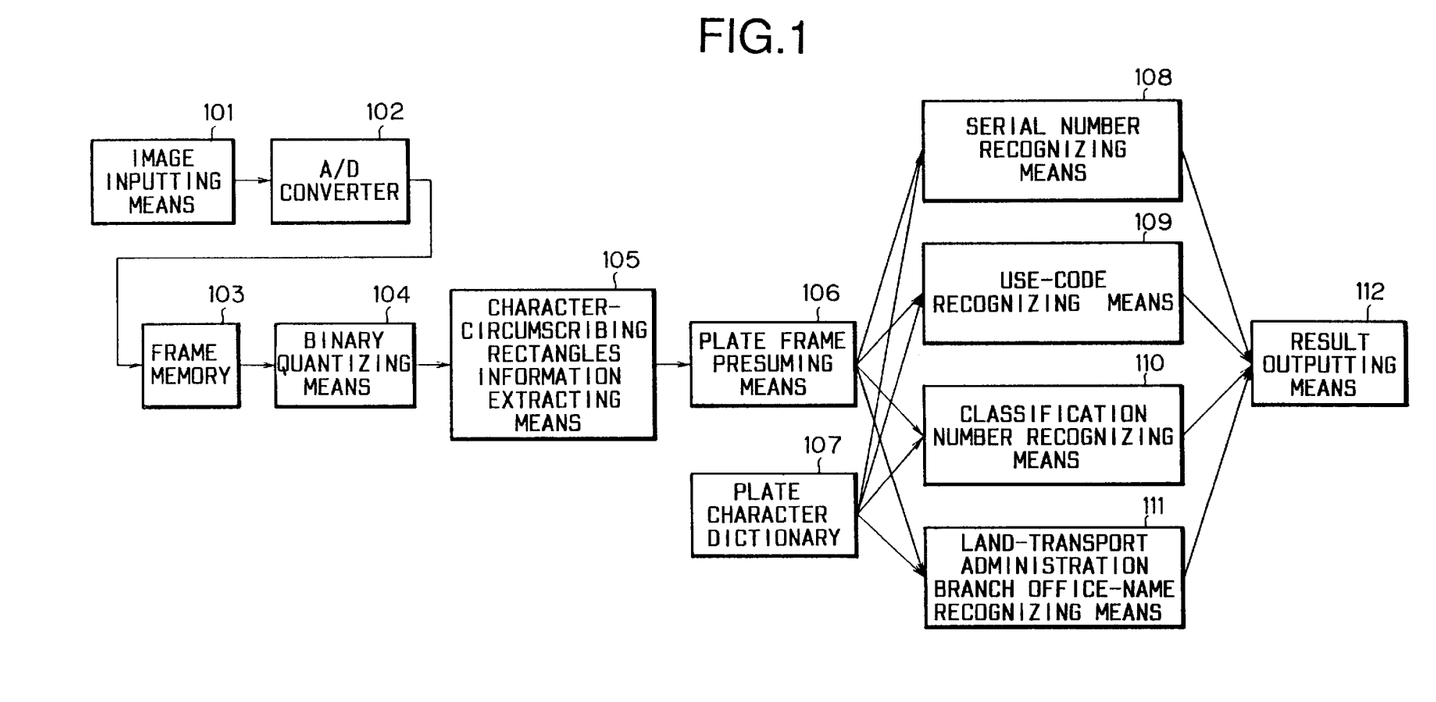
FIG. 1 is a block diagram showing a construction of an apparatus for realizing a character recognition method of recognizing characters on a license plate, which is a first embodiment of the present invention.

FIG. 1 is a block diagram showing a construction of a license-plate character recognizing system which is based on the character recognizing method according to the present invention. In FIG. 1, the system is composed of image inputting means 101 (e.g., a CCD camera) for inputting an image of a license plate, an A/D converter 102 for converting analog signals of the input image into digital signals, a frame memory 103 for storing multivalued image digitized by the A/D converter 102, binary-quantizing means 104 for converting the multivalued image of the license plate into a binary image, character-circumscribing rectangle information extracting means 105 for extracting character-circumscribing rectangle information from the binary image, plate frame presuming means 106 for presuming a frame of a license plate according to the character-circumscribing rectangle information, a plate character dictionary 107 for looking up characters contained in an image of the license plate, serial number recognizing means 108 for recognizing characters in areas $N_1$ to $N_4$ (shown in FIG. 4) for a serial number, use-code recognizing means 109 for recognizing a Japanese Hiragana character in a use-code area Y, classification number recognizing means 110 for recognizing numerals in a classification number area (⌈58⌋ shown in FIG. 7), land-transport administration branch office-name recognizing means 111 for recognizing characters (Japanese kanji characters • ⌈叁 良⌋ shown in FIG. 7) in an area for a name code of a Land-Transport Administration branch office, and result outputting means 112 for outputting results of recognition made by respective recognizing means 108 to 111.

Figure 2:
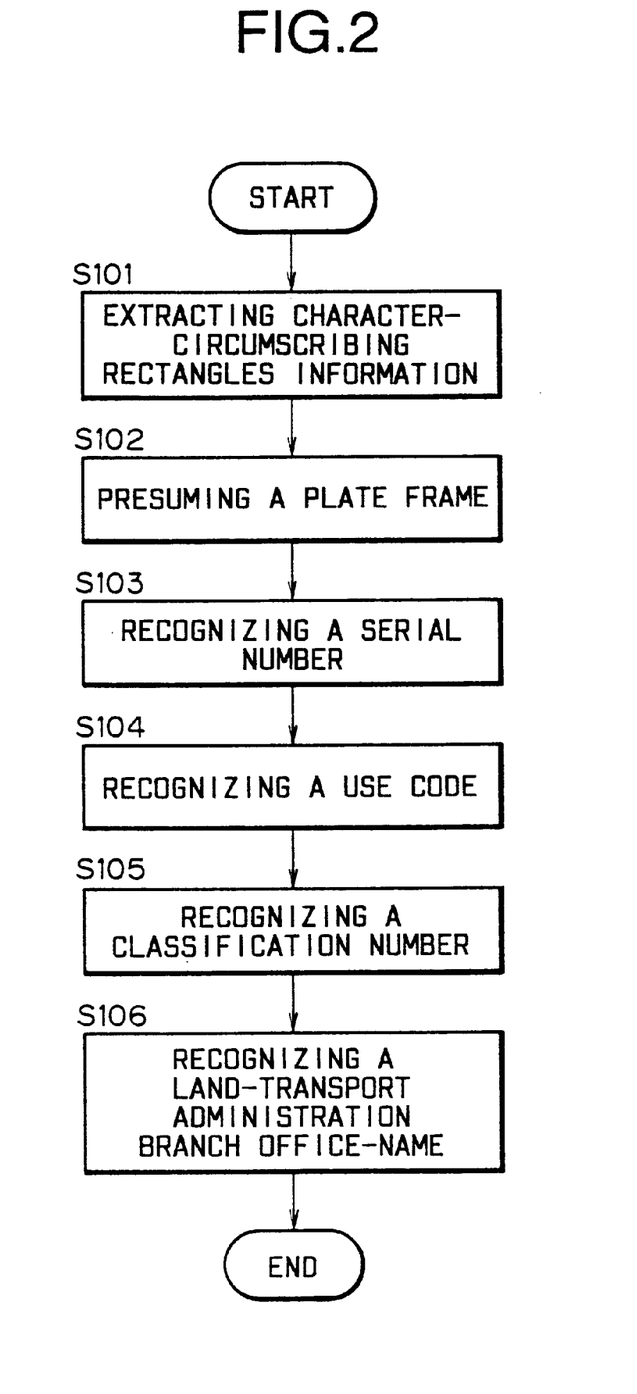
FIG. 2 is a flow chart describing a processing procedure of the method of recognizing characters on a license plate in the first embodiment of the present invention.

FIG. 2 is a flow chart describing a procedure of recognizing characters on an image of a license plate by a character recognition method which is the first embodiment of the present invention. The procedure includes the steps of extracting each character-circumscribing rectangle information (Step S101), presuming a plate frame (Step S102), recognizing a serial number (Step S103), recognizing a use-code (Step S104), recognizing a classification number (Step S105), recognizing a name of land-transport administration branch office (Step S106).

A license-plate image inputted by the image input means 101 converted by the A/D converter 102 into a multivalued image which is then stored in the frame memory 103. The multivalued image is further converted by the binary-quantizing means 104 into a binary image which is transmitted to the character-circumscribing rectangle information extracting means 105. The binary-quantizing means 101 may binarize the multivalued image by discriminant analysis or any other method that can not impair the character information.

The character-circumscribing rectangle information extracting means 105 performs the processing step S101 for extracting information on rectangles circumscribing respective characters in the manner described below:

The binary image of the license plate is processed by labeling. Namely, characters and background are distinguished from each other by giving different values to them. Each of the labeled characters is circumscribed by a rectangle. Coordinates of left top, right bottom and center points of each rectangle are extracted as character-circumscribing rectangle information and are registered in a table 105a as shown in FIG. 3.

At this stage, noise caused by binarizing the multivalued image and by a plate frame is judged from positions and sizes of the rectangles and may be omitted from the table.

Figure 3:
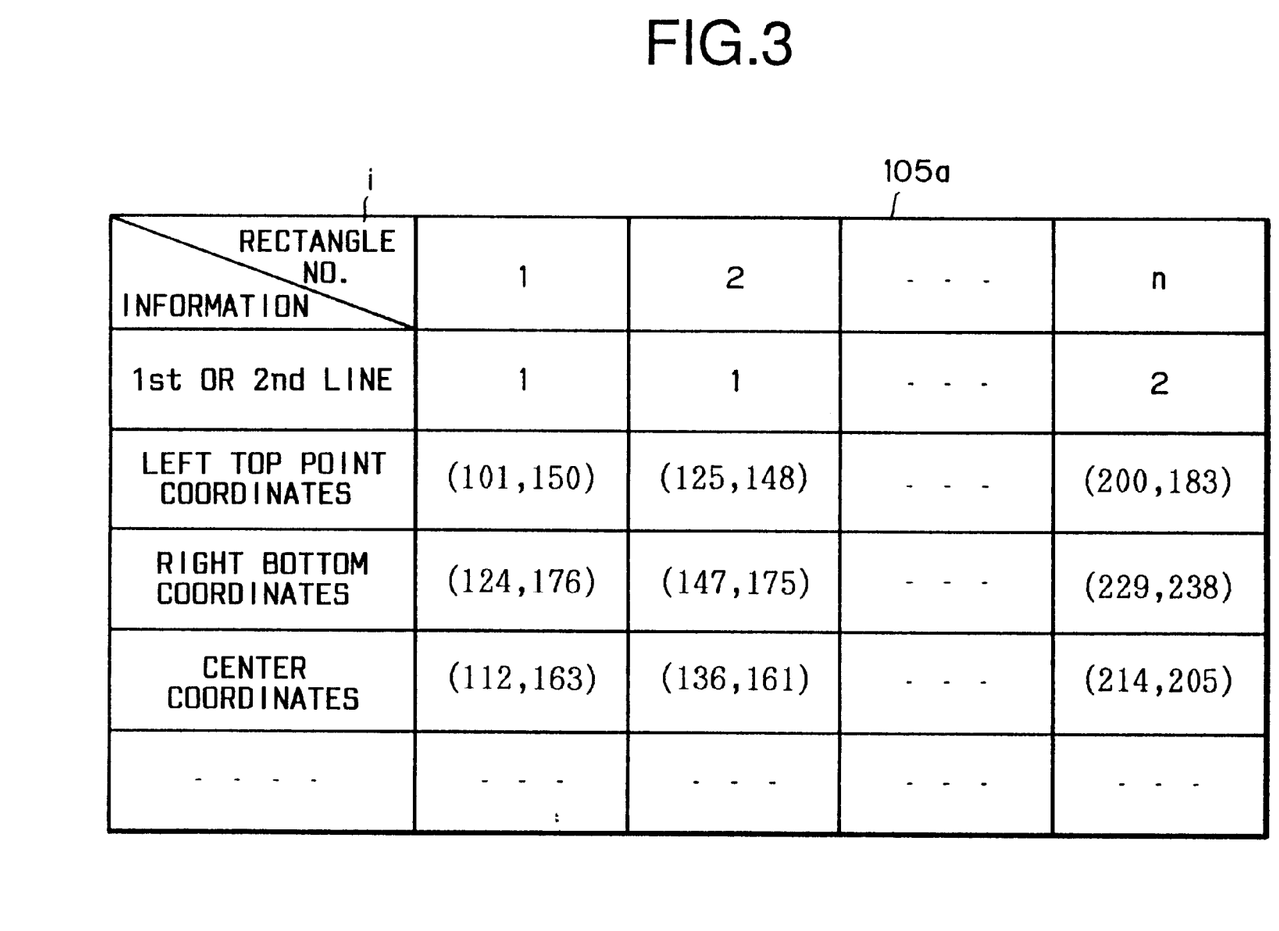
FIG. 3 shows a register table for storing information on character-circumscribing rectangles in the first embodiment.
Figure 4:
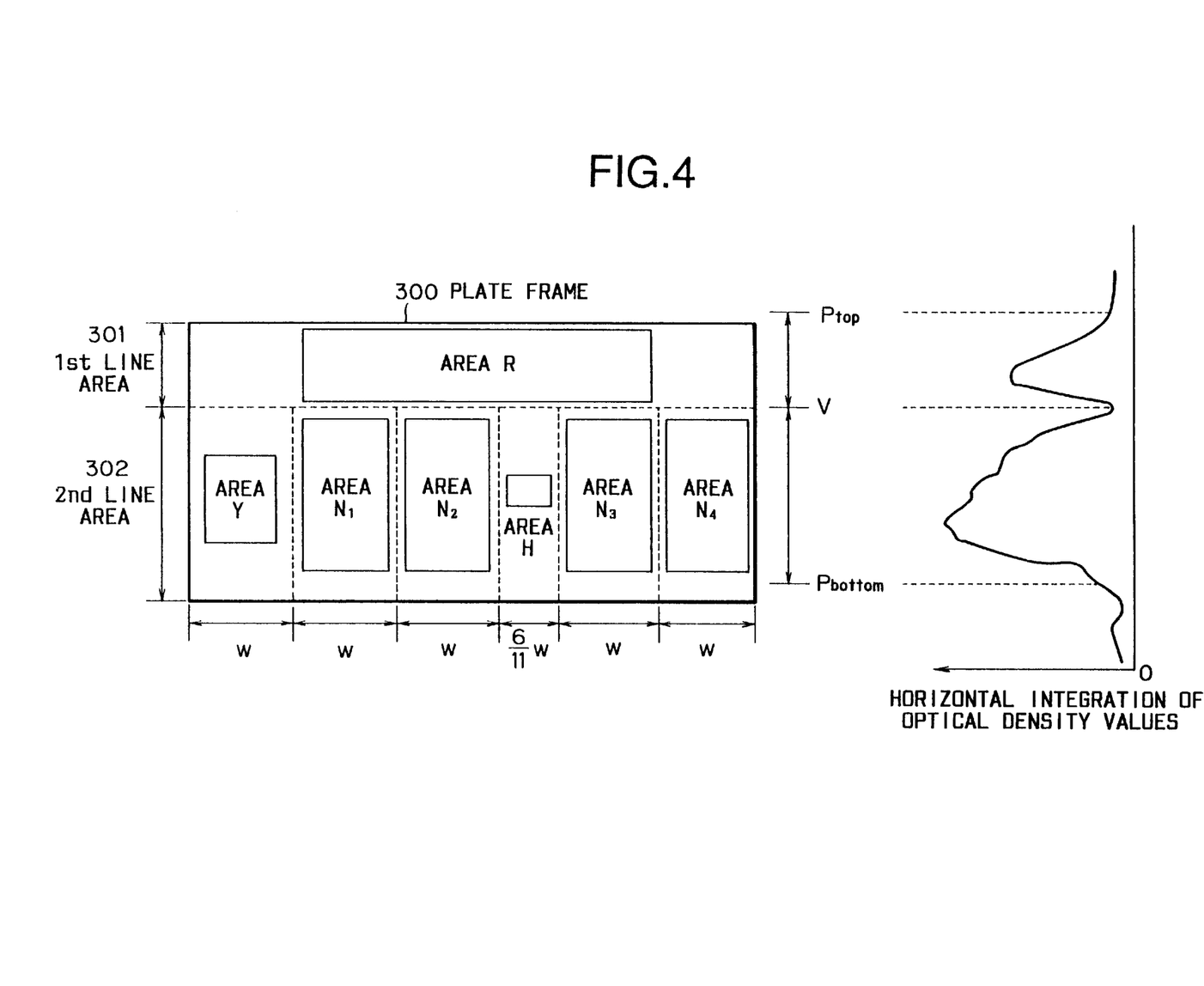
FIG. 4 is a view indicating sizes and positions of respective character areas in a license plate frame to be recognized by the first embodiment of the present invention.

In FIG. 3, the first (1st) Line or the second (2nd) line correspond to the 1st line area and the 2nd line area, respectively, of FIG. 4. Characters contained in a license plate image are divided by a boundary line V into characters in an upper area R (i.e., a name of the administration branch office-name and classification number in the area R) and characters in lower areas (i.e., use-code in area Y and a serial-number figures in areas $N_1$ to $N_4$ ). In the plate frame 300, an area of upper character string and an area of the lower character string are hereinafter referred to as the 1st line area 301 and the 2nd line area 302 respectively.

The boundary V can be easily determined from an image with vertical edges extracted by horizontally differentiating the multivalued license-plate image or from a horizontal integration of optical density values of the binarized image of the multivalued license-plate image. In the latter case, the boundary V lies on the bottom between two peaks of the vertically distributing integration values, which corresponds to a blank space between the 1st line and the 2nd line on the license plate (see FIG. 4). The top end $P_{top}$ and the bottom end $P_{bottom}$ can be easily presumed from the shape of vertically distributing integration values.

The plate frame presuming means 106 performs the processing step S102 of presuming the license plate frame in the manner described below:

A license plate has a plate frame 300 which has a particular format as shown in FIG. 4 arranging serial-number digit areas $N_1$ to $N_4$, a hyphen area H and use-code area Y in the 2nd line and an area R for an administration branch office-name and a classification number in the 1st line in a particular format as shown in FIG. 4. In the plate frame 300 of FIG. 4, coordinates of the left-end point, the right-end point or the center point of any one of areas $N_1$ to $N_4$, Y, H and R and width w of any one of the serial-number digit areas $N_1$ to $N_4$ are determined, so positions and configurations of the other areas can be uniquely determined. Namely, by determining a position and a width of a certain area on a plate it is possible to determine all other areas thereon. A whole area varies depending upon a position and a width of the same determined area.

Using known positional correlation between the serial number area $N_1$ to $N_4$, the hyphen area H, the use-code area Y and the administration branch office-name and classification number area R, several candidates of plate frames 300 are prepared in advance to be compared with information of character-circumscribing rectangles extracted from an input image of a license plate. Namely, one of the candidates, which is least disagreed from the input image information, is searched and selected.

It is then assumed that a plurality of candidate plate-frames 300 is set by using combinations of positions and width values of the areas $N_1$ to $N_4$ for a 4-digit serial number. One of the candidates, which best corresponds to an input image of a plate-frame, is determined by a method shown in flowcharts of FIGS. 5 and 6.

Figure 5:
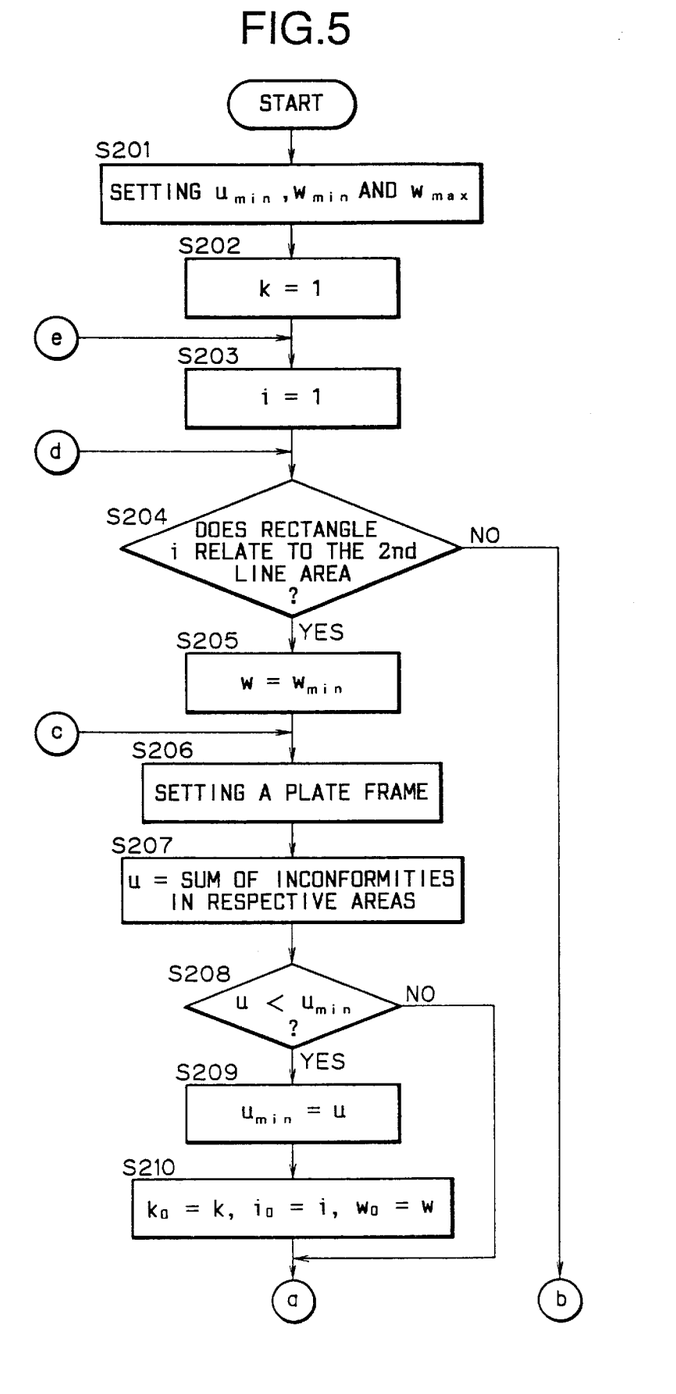
FIG. 5 is a flow chart describing the steps of processing a license plate frame by the first embodiment of the present invention.

Now, it is assumed that a rectangle circumscribing an i-th character in the 2nd line is placed in a serial number area $N_k$ (k=1, 2, 3, 4) and a center point coordinate of the serial number area $N_k$ is considered as a center point coordinate of said rectangle. The width is expressed by w which may be limited in a certain range, i.e., $w_{min}<w<w_{max}$ (Step S201). For example, $w_{min}$ may be a minimal width of a character (figure) composing the serial number and $w_{max}$ may be a maximal width of a character composing the serial number or $w_{min}$ may be a width of the i-th character-circumscribing rectangle in the 2nd line and $w_{max}$ may be equal to the left-end coordinate of an (i+1)-th character-circumscribing rectangle minus a right-end coordinate of an (i–1)-th character circumscribing rectangle. $u_{min}$ is an initial inconformity value of each character-circumscribing rectangle in each character area of a plate frame (Step S201).

As the serial number area $N_k$ consists of four divisions (digit areas)(k=1 to 4), an initial value is set as k=1 (Step S202). A table 150a (FIG. 3) of character-circumscribing rectangle information extracting means 105 contains n pieces of the circumscribing rectangles. An initial value of the i-th rectangle is set as i=1 (Step S203).

As a character string to be possibly entered into the serial number area $N_k$ (k=1, 2, 3, and 4) is a character string to be entered into an area 302 in the 2nd line, the rectangle number i is examined whether it exists in the 2nd line area 302 (Step S204). If so, the rectangle is further examined as to inconformity (Steps S205 to S212). No examination is made for the rectangle if its number i exists in the 1st line area (the process is skipped to Step S213).

A plate-frame can be set by determining any one of serial-number digit areas $N_k$ and selecting a certain value of its width w (Step S206). Since several candidates of plate frames are prepared, a total u of inconformity values of character-circumscribing rectangles to character areas of each plate frame (candidate) is calculated changing a variable w from the minimal value $w_{min}$ to the maximal value $w_{max}$ (Step S207). For this purpose, the processing procedure includes Step S205 for setting the variable w to $w_{min}$, Step S211 for incrementing the variable w and Step S212 for changing the variable w to $w_{max}$.

Figure 7:
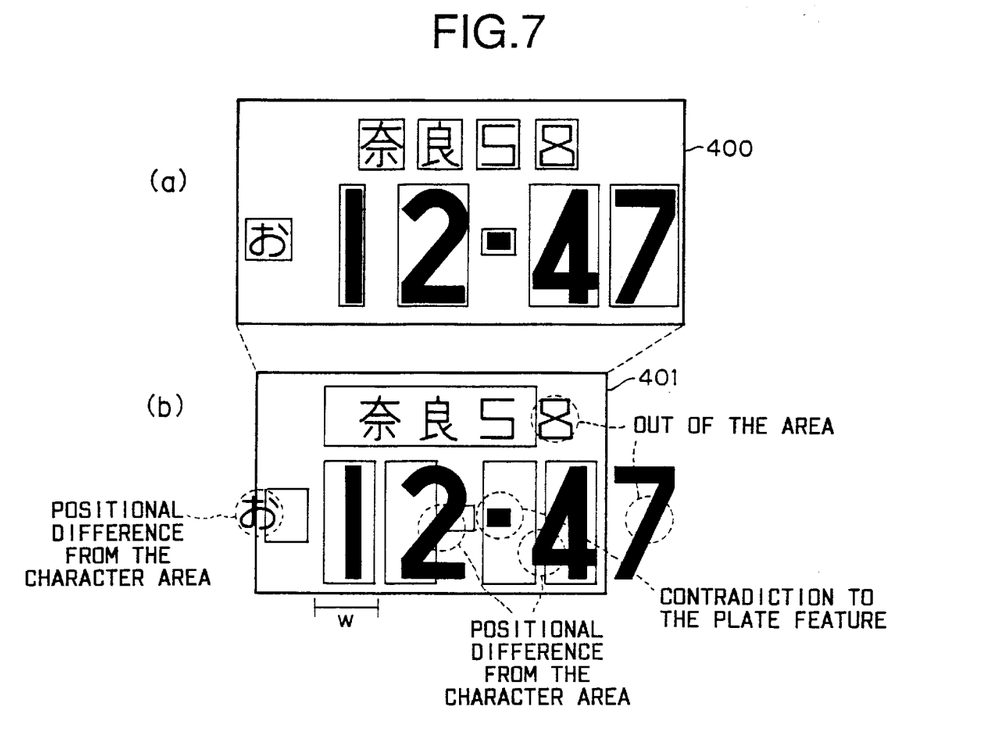
FIG. 7 shows a correct plate frame to be selected and a presumed (temporary) plate frame in the first embodiment of the present invention.

The part (a) in FIG. 7 shows a plate frame 400 which is finally considered to be correct relative to an inputted binary image and the part (b) in FIG. 7 shows a plate frame 401 which is temporarily set by the plate-frame presuming means 106 at Step S206 in the flow chart. The presumed plate frame 401 has a serial number area $N_k$ (i.e., k=1) of width w.

The temporarily presumed plate frame 401 may contain a variety of disagreement (inconformity) in areas other than the serial number area $N_1$ as shown in the part (b) in FIG. 7. Accordingly, inconformity of each area to the correct one is numerically estimated by using the below-described criteria and a total of inconformity values of respective areas is considered as a degree of inconformity of the plate frame 401 (Step S207).

(i) Degree of total inconformity: The temporarily presumed plate frame 401 must include a character-circumscribing rectangle in each character area. Accordingly, a certain inconformity value is given if there is any character-circumscribing rectangle being out of its area. In the shown example numeral "7" in the serial number and numeral "8" in the classification number are out of their respective areas.

(ii) Degree of inconformity in the use-code area: The use-code area Y must include one character of Japanese Hiragana whose height is within ⅓ to ½ of that of each figure in the serial number. If a character-circumscribing rectangle of the above-mentioned size is resting on the use-code area Y, a difference between center positions of the use-code area Y and the rectangle gives a certain value of inconformity. A larger character-circumscribing rectangle entering into the use-code area Y is estimated by giving a certain but not-so large inconformity value because the rectangle may sometimes contain the effect of a plate-frame line and shading.

(iii) Degree of inconformity in the hyphen area: Concerning a character-circumscribing rectangle having a small height in the hyphen area, a difference of the center position of the hyphen area H from the center of the small rectangle is estimated for giving a certain value of inconformity. A large character-circumscribing rectangle being entering into the hyphen area H and jointed by a noise signal to the second digit figure or the third digit figure of the serial number may be wider than each digit figure. Such inconformity value is not so large estimated. In case if the rectangle is sufficiently narrower than the width w, it may well be a digit figure of the serial number and is given an increased value of inconformity.

(iv) Degree of inconformity in the serial-number areas: Each digit area $N_k$ must contain a high rectangle circumscribing any one of figures "0" to "9" or a small rectangle circumscribing a small dot "". In this case, a difference of a digit area center position from a rectangle center position and/or a difference between the size of an area and the size of the rectangle gives a certain value of inconformity.

(v) Degree of inconformity estimated by contradictions of the use-code area and the serial number areas: Besides the estimation of a value of inconformity (difference of positions and difference of respective areas from respective rectangles, any contradiction in the properties of the plate is estimated and given a certain additional value of inconformity, which is added to a total inconformity of the candidate plate to increase an accuracy of the degree of total inconformity.

(a) The hyphen is placed only in a 4-digit serial number. Accordingly, a certain additional inconformity value is given if there is found such a contradiction that a character-circumscribing rectangle exists in the hyphen area H and a small-dot-circumscribing rectangle in the serial-number digit area.

(b) One figure of the 4-digit serial number is sure to be circumscribed by one rectangle with no noise signal. Accordingly, a certain additional inconformity value is given to such a contradiction that two or more character-circumscribing rectangles exist in a serial-number digit area.

(c) In a case that a string of serial number figures is composed without using 4-digit figures area, it is required that the string of number figures be shifted to right with the rightmost figure being out of the presumed plate-frame and with the small dot placed in a vacant digit area. So, if there occurs such a contradiction that a small dot " " exists in a right area to a serial number existing area, it is given a certain additional inconformity value.

(vi) Degree of inconformity in the number of characters contained in character areas of the plate frame: Name of a branch office (of the land-transport administration) may consist of one to four Kanji characters (e.g., 「奈」or 「京」to 「尾 張 小 牧」) and a fixing screw may sometimes be on a part of the character area. Furthermore, a large-size license plate in distinction from a standard-size license plate has a considerably different size ratio of the branch office-name relative to figures of the serial number and unspecified positions of the use-code and the serial number. These facts make it impossible to finely define a degrees of inconformity of the parameters. Accordingly, a certain value of inconformity is given in case if the area R of a registration branch name plus a classification number contains not more than three character-circumscribing rectangles. Similarly, a certain value of inconformity is given if the use-code area Y plus the serial number areas $N_k$ contains 4 or less character-circumscribing rectangles because it must include at least 5 character-circumscribing rectangles.

The above-described criteria are taken as an example and does not limit the invention thereto.

Figure 6:
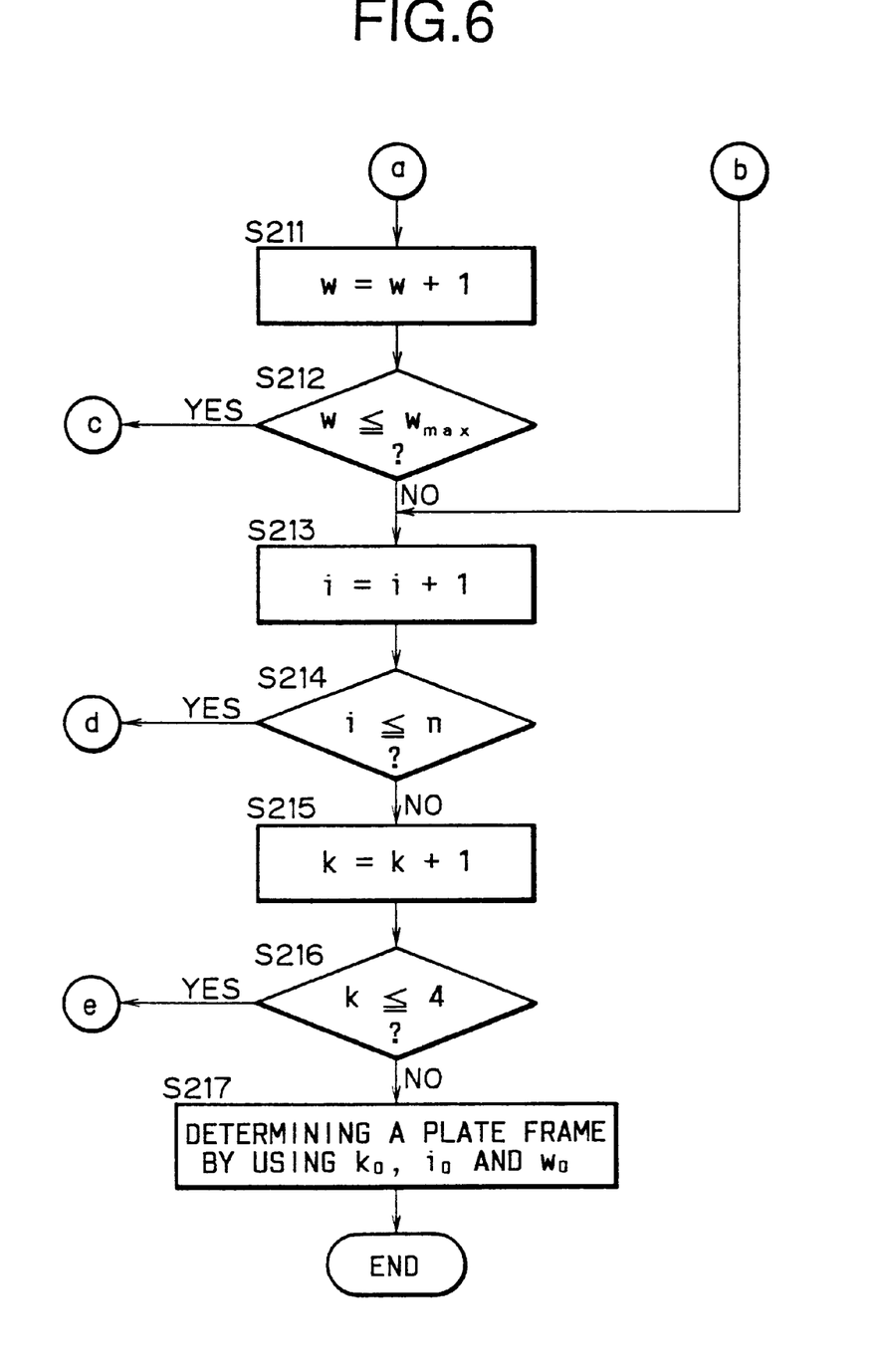
FIG. 6 is a flow chart describing the steps of processing a license plate frame by the first embodiment of the present invention (continuation of FIG. 5 ).

As described above, inconformity degrees of respective areas are estimated according to the criteria (i) to (vi) and summed up to obtain a total inconformity u (Step S207). The obtained total inconformity u is compared with a preceding minimal sum of inconformity values (Step S208) and is set as a new minimal sum of inconformity values $u_{min}$ (Step S209) if it is smaller than the preceding minimal sum of inconformity values $u_{min}$. At step 210, the number k of the serial number area is set in a variable $k_o$, a rectangle number i is set in a variable $i_o$ and the width w is set in a variable $w_o$.

Steps S206 to S210 relate to processings for setting a temporarily presumed plate frames 401 and comparing with several reference plate-frames to seek a plate-frame having the least inconformity to correct one of known reference plate frames.

The width w is increased with a small increment (Step S211) until it reaches the maximal width $w_{max}$ (Step S212). A new temporary plate frame 401 is set and processed in the same manner as described above to find a new temporary plate-frame 401 of the least inconformity.

The number i of a rectangle is changed from 1 to n (through Steps S213, S214) and the same processings as described above are conducted to find a temporary least-inconformity plate-frame 401 at the number k of the serial-number digit area. A variety of temporary plate-frames is set by changing the number of the serial-number area from 1 to 4 with an increment of 1 to find respective temporary least-inconformity plate-frames 401. Finally, a correct plate-frame 400 is determined on the basis of finally obtained values of the variables $k_o$, $i_o$ and $w_o$. The correct or most-approximated thereto plate-frame must exist among the temporary plate-frames 401 which have been set with all specified values w at all positions of the serial-number digit areas $N_k$ (k=1, 2, 3 and 4). The correct or most-approximated plate-frame must have the least inconformity at every character area. Namely, the temporary plate-frame 401 of the least inconformity, which has been found through Steps S206 to S210, is least contradictory to the input binary image and therefore determined as the correct plate-frame 400 shown in the part (a) in FIG. 7 (Step S217).

The serial-number areas $N_k$ (k=1, 2, 3 and 4), the use-code area Y and the branch office-name/classification-number area R on the license plate-frame are thus determined by the plate-frame presuming means 106 and, then, the processing advances to steps of recognizing characters in respective areas on the plate frame:

(3) The serial-number recognizing means 108 performs Step S103 (FIG. 2) of recognizing the serial number in the following manner:

The serial number consists of four figures which are represented by four character-circumscribing rectangles respectively and placed in corresponding digit areas $N_1$, $N_2$, $N_3$ and $N_4$. Accordingly, one of these four character-circumscribing rectangles, which center point exists close to the center of the digit area of the serial-number, is first selected and information of the selected rectangle is referred to only figures in the plate-character dictionary 107. The most similar figure found in the dictionary is determined as a recognition result. Similarly, other rectangles are processed one by one to determine a correct serial number in the serial-number digit areas. A small dot "" that appears in the case of a serial number consisting of less than four figures can be recognized by its size (small rectangle) and therefore determined as a small dot without looking up in the plate-character dictionary.

(4) The use-code recognizing means performs processing for recognizing a use-code (Step S104 in FIG. 2) as follows:

As the use-code area Y contains only one Hiragana character, the use-code recognizing means 109 compares to Hiragana characters in the plate-character dictionary, find a character being most similar to the use-code and recognizes the found character as a correct use-code.

(5) The classification number recognizing means 110 performs processing step of recognizing a classification number (Step S105 in FIG. 2) as follows:

The classification number (e.g., "58" in the part (a) in FIG. 7) consists of two figures of the same height, which is placed to the right side in the area R (for a branch office-name and a classification number) in the 1st line area 301 as shown in FIG. 4. Using the above-mentioned condition, the classification number recognizing means 301 reads each of two character-circumscribing rectangles having the substantially same height on the right side of the area R (starting the rightmost rectangle in the 1st line) and looks up the most similar one of reference figures "0" to "9" in the plate character dictionary 107. The two figures thus found in the dictionary are finally recognized as a correct classification number.

(6) The land-transport administration branch office-name recognizing means 111 performs processing for recognizing a registration branch name of the land-transportation administration (Step S106 in FIG. 2) as follows:

The classification number (e.g., "58" in the part (a) in FIG. 7) has been determined by the classification number recognizing means. The branch office-name, therefore, relates to rectangles other than two right-side rectangles (the classification number) in a character string in the character area R. Accordingly, the land-transport administration branch office-name recognizing means 111 compares information on each of the remaining character-circumscribing rectangles to Kanji and Hiragana characters in the plate-character dictionary to find the most similar characters. The characters thus determined are finally recognized as a correct branch office-name.

In the above-described embodiment, the character recognition steps were conducted in the order of the serial number, use-code, classification number and registration branch name. However, the order of performing the steps can be optionally changed since all character areas on the license plate have been already determined by Step S102 of presuming the plate frame.

As described above, all characters in all character areas are correctly recognized through the plate-frame presuming step and the respective character recognizing steps. Character recognition results are now outputted by the recognition result outputting means 112.

[Embodiment 2]

A second embodiment of the present invention concerns a license-plate character recognizing method which comprises the steps S101 to S106 of FIG. 2 and conducts the steps S101 to S105 (i.e., all steps excepting the step S106 of recognizing a branch office-name) in the same way as described before for the first embodiment. A least contradictory one of candidates is determined as a correct plate-frame 400 wherein a serial number and a use-code are then looked up in a plate-character dictionary 107 and most similar characters are finally recognized as a serial number and a use-code.

The branch office-name indicated in a character-string area on the license plate frame may consist of one character (e.g., 「奈」, 「京」) to four characters (e.g., 「尾張小牧」). Any multicharacter name is composed of a known limited combination of Kanji characters. The second embodiment uses the above-mentioned condition to increase the accuracy of recognizing branch office-names that could not be recognized at a high accuracy because of a large number of names and small sizes of characters.

Figure 8:
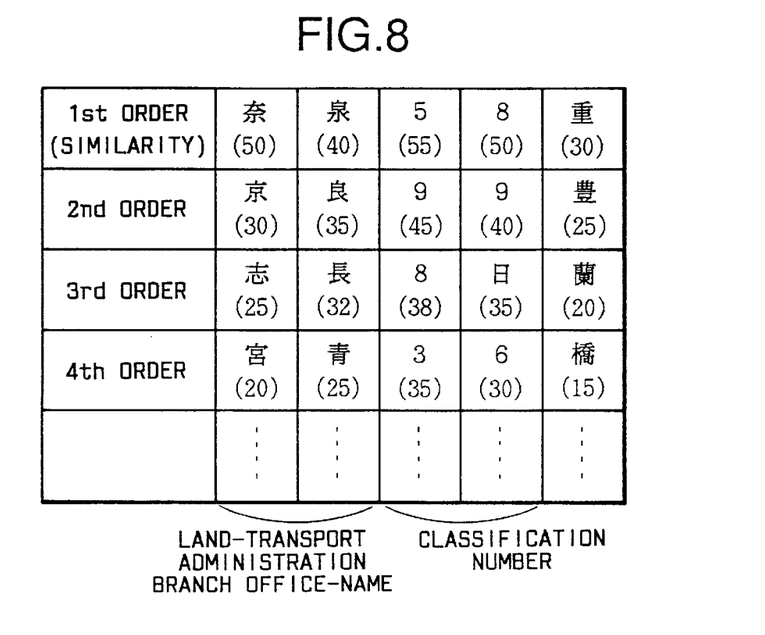
FIG. 8 shows a table wherein character strings obtained by a second embodiment of the present invention for an area of an administration branch office-name and a classification number are arranged in a descending order of similarity.
Figure 9:
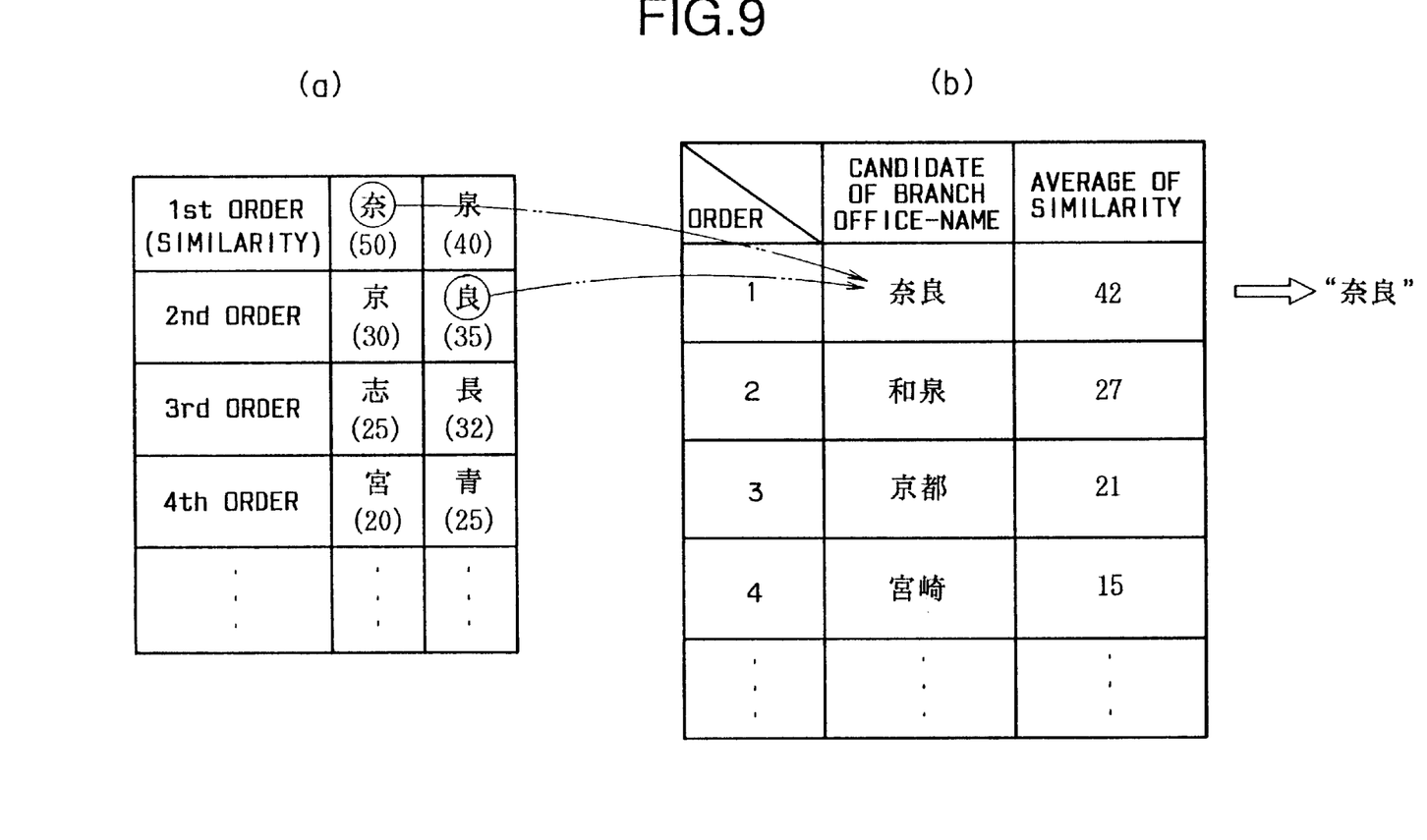
FIG. 9 shows a method of determining an administration branch office-name by average similarity value of a character string according to the second embodiment of the present invention.

The land-transport administration branch office-name recognizing means 111 performs the processing step (S106 in FIG. 2) for recognizing a branch office-name in the following manner:

A classification number in the area R (for a branch office-name and a classification number) is already determined by classification number recognizing means 110. Accordingly, the branch office-name relates to the rest part (other than right-hand characters of classification number) of the character string in the area R. The rest character string is now processed as follows:

FIG. 8 shows a table wherein character strings obtained by referring characters in a 1st line area 301 (in FIG. 4) to the plate-character dictionary 107 are arranged in the descending order of similarity. Referring to FIG. 9, the branch office-name recognizing means 111 reads each character string excepting a classification number (in the area R in FIG. 4) in the table starting from the top thereof and compares the character string to all reference character strings or a part of characters comprising all known branch office-names in the plate-character dictionary 107, arranges combinations of characters in the descending order of average values of similarity. A character string having the largest average value of similarity is finally selected as the branch office-name. By doing so, it is possible to realize high-accuracy character recognition of the branch office-name indicated on the license plate.

In practice, a character string 「奈泉」 of the top rank of similarity in the table (a) in FIG. 9 is referred to branch office-names in plate-character dictionary 107 and a candidate of 「奈良」 (the key character is 「奈」 in this case) is extracted. The character 「良」 in the candidate does not meet with the character 「良」 and, therefore, it is looked up in the table. Since the character 「良」 is found in the second rank character string in the table, the character string 「奈良」 is obtained and its average value of similarity is equal to 35 by averaging the similarity value 50 and 35 of two characters (see FIG. 9).

The table (a) in FIG. 9 contains a character 「和」 (not shown) with a similarity value of 14 as a first character of the 14th rank character-string, a characters 「都」 (not shown) with a similarity value of 10 as a second character of the same rank character-string and a character 「崎」 (not shown) with a similarity value of 10 in the 10th rank character-string. Accordingly, further similar operations can obtain character strings 「和泉」 (with an average similarity value of 27), 「京都」 (with an average similarity value of 21) and 「宮崎」 (with an average similarity value of 15) as shown in the table (b) in FIG. 9. Thus, the table (b) in FIG. 9 registers therein candidates of the branch office-name in the descending order of the average similarity values and the character string 「奈良」 having the largest average value of similarity is selected as the correct branch office-name.

Although the above-mentioned method uses the average similarity as a criterion of recognizing the branch office-name, the present invention is not limited to the average similarity criterion and allows use of other criteria such as relative positions of characters, the number of characters, ranks of candidates and the like.

Although the above-described embodiments 1 and 2 of the present invention are applied for recognizing characters on a license plate for an automobile, the present invention is not limited to the embodiments and can be also applied for recognizing characters of any character image having a specified format, for example, ship name plates, road signs and so on.

The character recognition method according to the present invention comprises the steps of extracting information on each of rectangles circumscribing respective characters contained in an inputted binary quantized image and selecting least disagreed (inconformity) one of area-frame candidates preset according to a known format of character areas on a recognition object by means of comparing each of the candidates with the extracted character-circumscribing rectangles as to inconformity (contradiction) of relative arrangement of the rectangles to character areas on the character frame and recognizing characters indicated in the selected character areas respectively. As this method compares each of area-frame candidates with an extracted information on character-circumscribing rectangles and selects such an area-frame candidate that is least disagreed with the rectangles as to positions of their character areas relative to the rectangles, the selected character areas may have a correct relation with the extracted rectangles even if an input image does not include a part of the character recognition object or lacks a part of information due to an obstruction or contains noise signals from peripheral portion of the object. Thus, the method can attain a high accuracy of character recognition since it recognizes each of characters on the character area candidate selected by the least disagreed principle.

The character recognition method according to the present invention is featured in that the step of selecting least disagreed one of area-frame candidates includes calculating a degree of disagreement in properties and conditions of character areas of candidate with the extracted information on character-circumscribing rectangles, determining a total of the calculated disagreements of the character areas and selecting an area frame having the least inconformity. Thus, the method can attain a considerably improved accuracy of selecting a correct area frame.

The character recognition method according to the present invention is featured in that the step of recognizing a string of characters selects a character string having a largest average value of similarity of compared characters. A character string composed of a combination of characters is known and considerably restricted. This method can attain an increased accuracy of recognizing a character string by selecting a character string having the largest average similarity, which is composed of characters each having a largest value of similarity to each of the restricted character strings.

What is claimed is:

1. A character recognition method comprising the steps of:

obtaining, from an input binary-quantized image, an input pattern of plural rectangles, each rectangle having a rectangle position and circumscribing a respective character-bearing area;

collectively comparing, for each of plural candidate frames, the rectangle positions of the plural rectangles of the input pattern with respective plural predetermined rectangle positions of the plural candidate frames;

selecting one of the candidate frames having the least inconformity with the input pattern as a selected candidate frame; and then recognizing characters in the input pattern based on the rectangle positions of the selected candidate frame.

2. A character recognition method as defined in claim 1, wherein the step of selecting the selected candidate frame includes:

for each candidate frame:
calculating a degree of inconformity with respect to each rectangle position in the input pattern,
determining a total of the calculated inconformity values over all rectangle positions of the input pattern, and using the total to select the selected candidate frame.

3. A character recognition method as defined in claim 1, wherein the step of recognizing characters includes recognizing a string of characters by selecting a character string having a largest average value of similarity of component characters.

4. The method of claim 1, wherein the input pattern is obtained from an article having multiple character-bearing areas circumscribed by respective ones of the plural rectangles, and wherein the method further comprises:

assigning at least one parameter to a selected character-bearing area on the article;

calculating the plural candidate frames using a predetermined positional correlation between the selected character-bearing area as represented by the at least one parameter and other character-bearing areas of the article.

5. The method of claim 4, further comprising assigning a position parameter and a width parameter to the selected character-bearing area.

6. The method of claim 4, wherein the at least one parameter is assigned by iterating between a maximum and a minimum value of the at least one parameter, and wherein for each iterated value of the parameter the comparing step is performed with the candidate frames being prepared using the predetermined positional correlation between the selected character-bearing area as represented by the iterated value of the parameter and the other character-bearing areas of the article, and wherein the correct frame is obtained considering all iterations of the parameter.

7. The method of claim 6, wherein the iterated at least one parameter is area width.

8. The method of claim 4, wherein the comparing step involves determining a degree of inconformity of each of the plural candidate frames with respect to predetermined criteria.

9. The method of claim 8, wherein the predetermined criteria includes criteria pertaining to plural ones of the character-bearing areas.

10. The method of claim 8, wherein the correct frame has a least inconformity with respect to each of the character-bearing areas.

11. The method of claim 1, wherein the input image is obtained from a license plate.

12. The method of claim 11, wherein the selected character-bearing area is in a predetermined portion of the license plate.

* * * * *